K. LINDSEY.
GANG PLOW.
APPLICATION FILED JAN. 15, 1920.
1,375,054.
Patented Apr. 19, 1921.
2 SHEETS—SHEET 1.
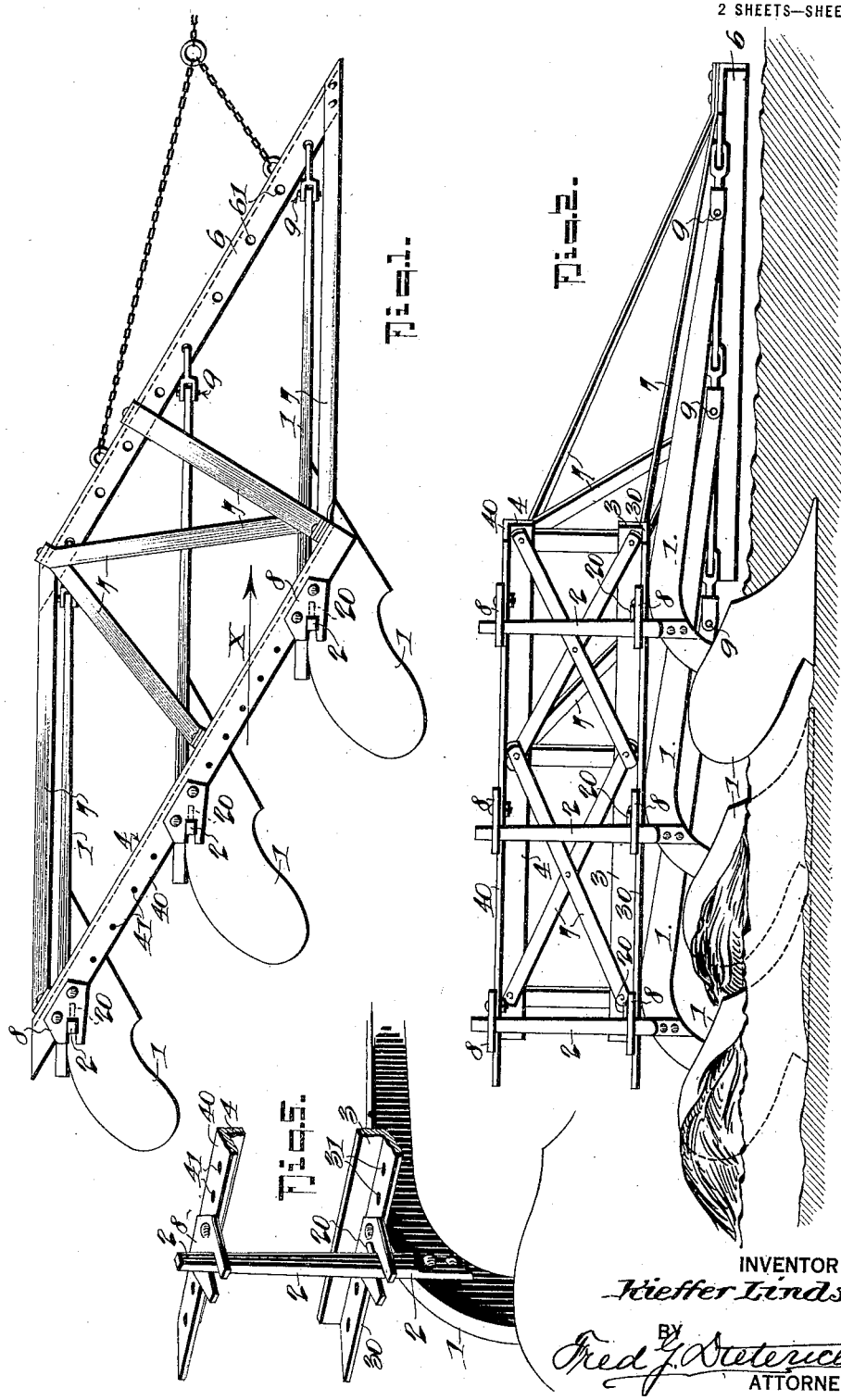
INVENTOR
Kieffer Lindsey.
BY
Fred J. Dieterich
ATTORNEYS

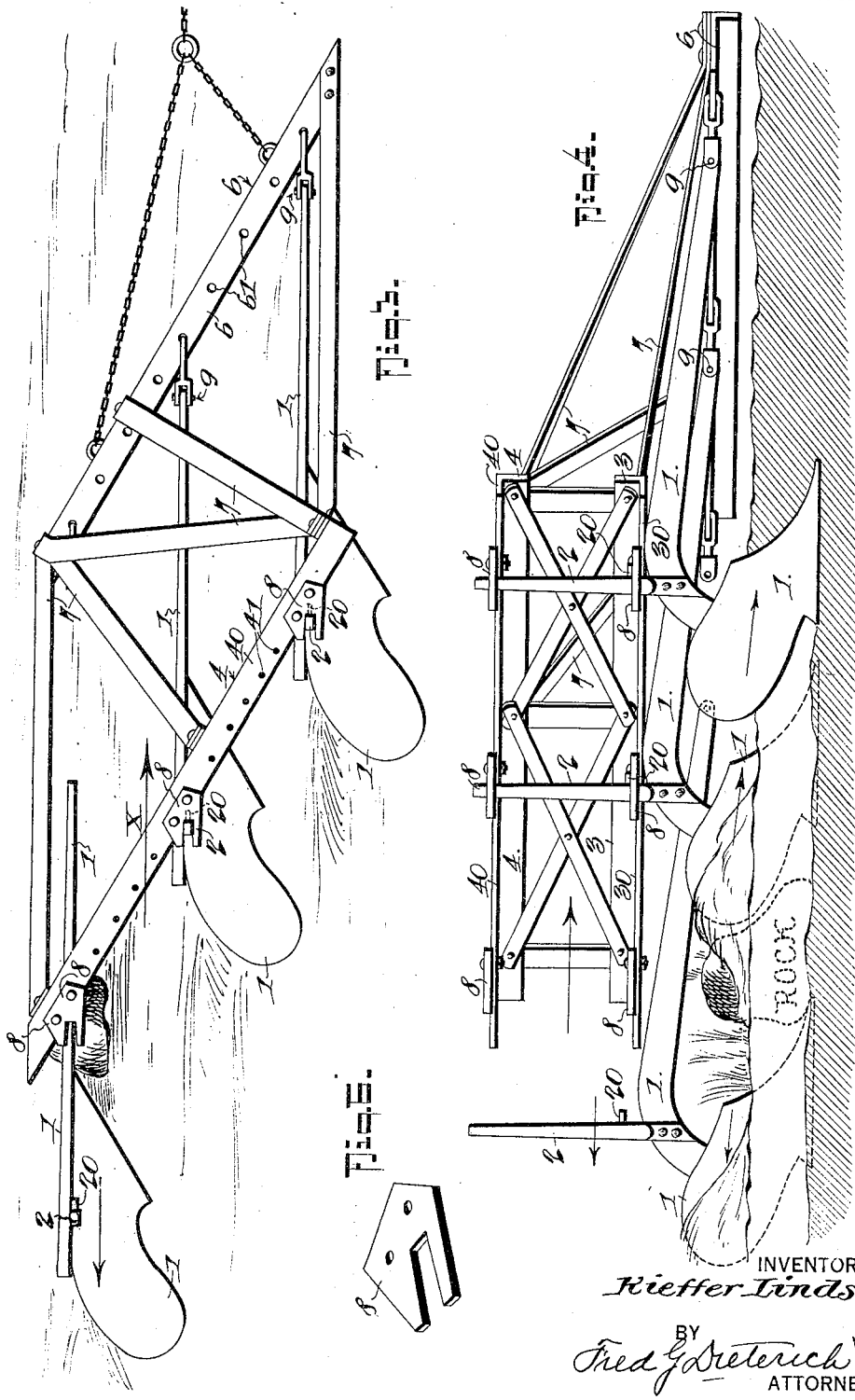

UNITED STATES PATENT OFFICE.

KIEFFER LINDSEY, OF ROME, GEORGIA.

GANG-PLOW.

1,375,054. Specification of Letters Patent. Patented Apr. 19, 1921.

Application filed January 15, 1920. Serial No. 351,657.

*To all whom it may concern:*

Be it known that I, KIEFFER LINDSEY, a citizen of the United States, residing at Rome, in the county of Floyd and State of Georgia, have invented certain new and useful Improvements in Gang-Plows, of which the following is a specification.

My invention which relates generally to improvements in gang plows and like agricultural implements, more particularly has reference to an improved means for so connecting each one of the plows in a gang, to the draft devices, that provides for the automatic release of any one of the plows when it strikes an impassible obstruction and thereby becomes entirely free from the remainder of the plow gang.

As is well known to those familiar with the working of gang plows and other like agricultural implements or machinery in which are included a plurality or gang of cultivating units, when a power pulled plow strikes a stone or other impassible barrier or obstruction, there is danger of breaking either the plow or the traction mechanism, if the obstructed plow or other cultivating unit is not quickly released from the remainder of the complete machine of which it constitutes a part.

Another and essential object of my invention is to provide, in a gang plow or other like cultivating mechanism, a simple, inexpensive and effective means for conveniently joining the plow to the draft bar, which includes, with a break pin device connecting the plow beam and the draft bar, means for detachably engaging each plow unit with the gang framing, whereby to secure each individual plow against lateral displacement during the normal operation thereof and which provides for a quick and positive release of a plow unit, when its break pin snaps, without disturbing the operative positions of and for permitting the continued and uninterrupted forward travel of the remaining plows, the said means for holding the plow in engagement with the plow framing being also adapted for a quick and positive reconnection of the released plow with the remaining gang of plows before the release plow gets out of a proper operative alinement with the other ones of the plow gang.

While I shall describe my invention in detail and illustrate the same as particularly applied to a plow gang construction, it should be here stated that the frame shown as carrying the plows is adaptable to any number of plows, turning plows, subsoil plows, rooter or other plows or any other implement combination comprising individual units and utilized for breaking, preparing and cultivating.

The spacing of the plows or other ground operating units in the supporting frame, in my arrangement, is entirely optional and has no limit.

With other objects in view and hereinafter referred to, my invention comprises a gang plow or like agricultural machine construction that embodies the peculiar features and novel combination of parts, all of which will be stated in detail in the following explanation, specifically pointed out in the appended claims and illustrated in the accompanying drawings, in which:

Figure 1 is a diagrammatic plan view of a gang plow structure in which is embodied my invention, the plows being shown in a normal or alined position.

Fig. 2 is a diagrammatic side elevation of the gang plow structure arranged as shown in Fig. 1.

Fig. 3 is a view similar to Fig. 1 and it illustrates one of the plows as coengaging with an obstruction, its beam connection with the draft bar broken and the said release plow positioned as held back from the other or advancing plows.

Fig. 4 is a view similar to Fig. 2 of the structure arranged as in Fig. 3.

Fig. 5 is a detail perspective view of one of the vertical plow guides or standards and the slotted member that holds the said standard in operative connection with the framing.

Fig. 6 is a detail view of one of the adjustable slotted combined guides and braces for the plow standards and hereinafter specifically referred to.

In the drawings, in which my invention is more or less diagrammatically shown, I have illustrated the same as embodied in a gang of three ordinary horse or tractor drawn frail turning plows, it being understood that the gang may consist of two or more and instead of being in the nature of turning plows, the gang may consist of two or more other plows or any combination of other plows or like means used for breaking, preparing or cultivating, &c., and in which the spacing of the several units is entirely optional and has no limits.

In the present showing of my invention, I have illustrated a preferred embodiment thereof, as will be presently described in detail, it being premised, however, that various changes can be made in the details of construction and arrangement of the different parts without departing from the spirit and scope of my invention as defined in the appended claims.

In carrying out my invention, each plow unit 1, of the gang, is provided with a steel standard 2 that is firmly bolted at its lower end to the steel beam of the plow 1, at or near its highest point, when the plow is erect, as when plowing.

3 designates a lower angled bar and this bar, in the practical assemblage of parts, rests with its horizontal and rearwardly extended portion 30 upon (but is not rigidly attached to) the several beams of the plow gang, near the highest points thereof.

4 indicates an upper angled bar, similar to the bar 3 and it is located in parallelism with the said bar 3 with its upper or horizontal member 40 extended rearwardly, as is clearly shown in Figs. 2 and 5.

6 designates an angled beam located adjacent to and, in practice, a few inches in advance of the front ends of the beams of the several turner plows. The bar or beam 6 serves the purpose of a common draw bar for all turners composing the gang.

The several angled bars 3 and 4 and the beam or bar 6 are rigidly connected by a system of light steel brace members 7 arranged for example, as shown in the drawings.

The standards 2—2—2 rigidly attached to the several plow beams, when the bars are operatively arranged, extend vertically past and adjacent to the rear edge of the horizontal members 30 and 40 of the upper and lower bars 3 and 4 and each of the said standards 2 is received in a slotted bracket 8.

As is clearly shown in the drawings, a pair of upper and lower brackets 8—8 are provided for each standard 2 and the said brackets are firmly and so attached to their respective lower and upper bars 3 and 4 that their open end slots are directed backward in the longitudinal draft line (see the arrow x on Fig. 1) that the standards may be readily received in their coincident set of upper and lower brackets in such manner that they will readily free themselves from the said brackets, when their respective draw pins 9, that connect them to the draft beam 6, are broken.

The draw pins 9, of the common type of wooden break pins, when the plow strikes a stone, root or other obstruction, are broken, thereby freeing their respective front end of the plow beam.

By engaging the standards 2 of the several plows with the framing rigidly connected with the draft beam 6, as before described and shown, the standard 2 of the beam that becomes disconnected from the draft beam, when the draw pin is broken, passes out at the open end of the respective sets of upper and lower brackets 8—8 and that particular one of the gang or turners is freed from the remaining ones of the gang as the latter continue forward, leaving, as it were, the freed turner or plow at the place of obstruction, as is clearly shown in Figs. 3 and 4 of the drawings and in such position that the operator, after stopping the gang, can readily replace or hitch the freed turner with the draw beam, by a new wooden draw pin and thus provide for proceeding with plowing with the complete gang.

I am aware that plow gangs have been heretofore provided in which a plow unit is freed from the draft connections by the breaking of a wooden draft pin. My invention differs, so far as I know, from what has been done in this particular art as follows:

My specific means for holding up each plow unit to its operative condition provides for an independent lateral support for each plow. The standards 2 rigidly secured to the plow beam (at or near the highest point) are held from lateral shifting by their respective sets of upper and lower slotted brackets 8 adjustably mounted on the upper and lower bars 3 and 4 that constitute the rear portion of the gang frame.

The brackets 8, before referred to, in the gang plow assemblage are adjustably connected to the upper and lower bars 3 and 4 for being moved lengthwise of the said bars, the latter having uniformly spaced apertures 31 and 41 for bolting the brackets at their selected adjustments along such bars.

Draft beam 6 is likewise apertured as at 61 for coupling the plow beams thereto, as desired.

By providing slotted brackets 8—8 laterally adjustable along the bars 3 and 4 and laterally shiftable hinged connections for the beams, means is thus provided for any desired spacing of the plows (that support the standards 2) laterally and allows for the freed plow to remain stationary as the gang moves forward, after the pin 9 is broken.

Thus each plow is entirely independent of any of the other plows in the gang, making the use of one or any number of plows optional without any alteration of the gang frame, except adjusting the slotted bracket 8 along the upper and lower angled bars 3 and 4, as stated.

Another and important advantage in connecting up a plow gang, as shown in the drawings and heretofore explained, is, since in my construction, the plow beam and the standards that constitute a rigid part of the beam and which engage with the draft frame, have no lateral projections, the beams therefore will not catch stalks, vines, roots, weeds &c. that may cause the plow to choke with collected debris until it cannot function.

Again in my construction, a further advantage is provided in the perfect separation or freedom of the released plow from the gang frame, when the draft pin breaks, as there is no possible chance for the released plow or its standards to hang or catch on the other members of the gang.

As a means for further stabilizing the plow structure, each beam standard 2 is provided with a forward projection 20 that rests on top of the brackets 8 attached to the lower angled bar 3 and thereby leaves the plow with the gang so long as the break pin is normal but allows the draft frame, with the remaining plows, to move forward from the held back or freed plow.

It will be noted that the lower angled bar 3 rests loosely, without being attached, on the plow beams at their highest point. This contact forces each plow to the same depth in the ground, while the projection 20 from the standard 2, resting on top of the slotted brackets 8, lifts the plow with the gang and prevents any plow from going too deep in soft places, &c.

From the foregoing description taken in connection with the drawings, the distinctive features, the manner of operation and the various advantages of my invention will be readily apparent to those skilled in the use of cultivating means of this character, it being clear that the comparative simplicity of my construction is conducive to economy of production and manufacture.

The gang is readily convertible from one to any number of plows (up to the maximum provided for in each gang when built) and each plow is as an individual unit and absolutely independent of any of the other plows of the gang.

Perfect clearance is given for the debris to pass between plows and the construction stated may be successfully used with and without wheels and drawn with horses or tractors.

What I claim is:

1. In a plow or like structure, a draft frame including a draft bar and a break pin that connects the plow beam with the draft bar; of a standard fixedly attached to the beam near the plow end, a guide on the rear of the draft frame that has an open end rearwardly extended slot in which the plow standard is held as the plow is being pulled and from which it becomes wholly disconnected, when the pin breaks.

2. In a gang plow or like structure, a draft frame including a draft bar, and an independent break pin connection for each plow beam; a guide for each plow beam attached to the rear end of the draft frame, said guides each having an open end slot, a standard on each plow adapted for moving into the open end slot of its respective guide, when the plow is hooked up with the draft bar and to pull out of the said slot as the draft frame proceeds, when the pin connection of its respective plow breaks.

3. In a gang plow or like structure, a draft frame including a draft bar, and an independent break pin connection for each plow beam; a guide for each plow beam attached to the rear end of the draft frame, said guides each having an open end slot, a standard on each plow adapted for moving into the open end slot of its respective guide, when the plow is hooked up with the draft bar and to pull out of the said slot, as the draft frame proceeds, when the pin of its respective plow breaks, the said slotted guides and their corresponding break pin connections being laterally adjustable on the draft frame and bar.

4. In a gang plow or other like structure, the combination with a plurality of plows, each having a standard, and a draft frame that includes a horizontally angled plate adapted for resting on the beams of all of the plows, each plow beam having an attached standard, break pin connections that individually join each plow beam with the draft frame, a guide for each plow standard attached to the angled plate, said guides each having an open end slot into which their respective plow standards project, when the plows are hitched to the draft frame.

5. In a gang plow or other like structure, the combination with a plurality of plows, each having a standard, and a draft frame that includes a horizontally angled plate adapted for resting on the beams of all of the plows, each plow beam having an attached standard, break pin connections that individually join each plow beam with the draft frame, a guide for each plow standard attached to the angled plate, said guides each having an open end slot into which their respective plow standards project, when the plows are hitched to the draft frame, said break pin connections having lateral adjustment along the draft frame and the slotted guides having lateral adjustment along the angled bar on the draft frame.

6. In a gang plow or like structure, a draft frame including a draft bar, and an independent break pin connection for each plow beam; a guide for each plow beam attached to the rear end of the draft frame, said guides each having an open end slot, a standard on each plow adapted for moving into the open end slot of its respective guide, when the plow is hooked up with the draft bar and to pull out of the said slot, as the draft frame advances, when the pin connection of its respective plow breaks, the said slotted guides and their corresponding break pin connections being laterally adjustable on the draft frame and bar, each standard having an inwardly extended lug that engages the under side of its respective slotted guide.

7. In a gang plow or like structure, a draft frame including a draft bar, and an independent break pin connection for each plow beam; a guide for each plow beam attached to the rear end of the draft frame, said guides each having an open end slot, a standard on each plow adapted for moving into the open end slot of its respective guide, when the plow is hooked up with the draft bar and to pull out of the said slot, as the draft frame advances, when the pin connection of its respective plow breaks, the said slotted guides and their corresponding break pin connections being laterally adjustable on the draft frame and bar, each standard having an inwardly extended lug that engages the under side of its respective slotted guide, and a similar inwardly extended lug that engages the upper side of its respective slotted guide.

8. In a gang plow or like structure, a draft frame including a draft bar, and an independent break pin connection for each plow beam; a guide for each plow beam attached to the rear end of the draft frame, said guides each having an open end slot, a standard on each plow adapted for moving into the open end slot of its respective guide, when the plow is hooked up with the draft bar and to pull out of the said slot, as the draft frame advances, when the pin connection of its respective plow breaks, the said slotted guides and their corresponding break pin connections being laterally adjustable on the draft frame and bar, and means for holding the standards from vertical movement relatively to the draft frame, when they are located within their respective slotted guides.

KIEFFER LINDSEY.